United States Patent [19]
Raczkowski

[11] 3,958,965
[45] May 25, 1976

[54] ASH TRAY WITH SMOKE FILTER

[76] Inventor: Mark B. Raczkowski, 741 Manhattan Ave., Brooklyn, N.Y. 11206

[22] Filed: Sept. 29, 1975

[21] Appl. No.: 617,934

[52] U.S. Cl. ............................... 55/385 G; 55/473
[51] Int. Cl.² .......................................... B01D 46/00
[58] Field of Search ............. 55/387, 385, 467, 473, 55/471, 472, 502

[56] References Cited
UNITED STATES PATENTS

| | | |
|---|---|---|
| 2,788,085 | 4/1957 | Waller .................................. 55/385 |
| 3,516,232 | 6/1970 | Gilbertson ........................... 55/385 |

*Primary Examiner*—Bernard Nozick

[57] ABSTRACT

An ash tray unit, containing on the top a removable ash tray with side vents, an electric fan in the middle, an easy to change smoke filter below. The smoke which is produced by cigarettes or cigars placed on the ash tray is drawn through inlet vents and purified in the smoke filter. Improved air is forced out of unit. The ash tray with smoke filter is ideal for offices, hospitals, appartments, automobiles, busses, airplanes and generally for enclosed areas with smoker-non smoker relations.

1 Claim, 2 Drawing Figures

ASH TRAY WITH SMOKE FILTER

REFERENCES

| U.S. Pat. No. 2,788,085 | 9/1957 | Waller | 55-385 X |
|---|---|---|---|
| U.S. Pat. No. 3,516,232 | 6/1970 | Gilbertson | 55-387 X |

DESCRIPTION

Smokers sitting in enclosed areas used to place their smoking cigarettes or cigars on ash trays, allowing the smoke to pollute the surrounding environment. The latest news from medical sources are that cigarette smoke is unhealthy for smokers, but is even more dangerous for non smokers and children. Therefore it is an object of this invention to provide an ash tray unit in which the cigarette or cigar smoke is purified through in a smoke filter. If desired, a few drops of a refreshner or deodorizer can be placed on the smoke filter to improve quality of leaving air.

The ash tray is removable from the unit and easy for clean up. The smoke filter can be displaced and changed easily from the bottom, without disassembling any part of the unit. Functioning of the ash tray unit will become understandable on the following description and drawings, in which.

Figure 1:
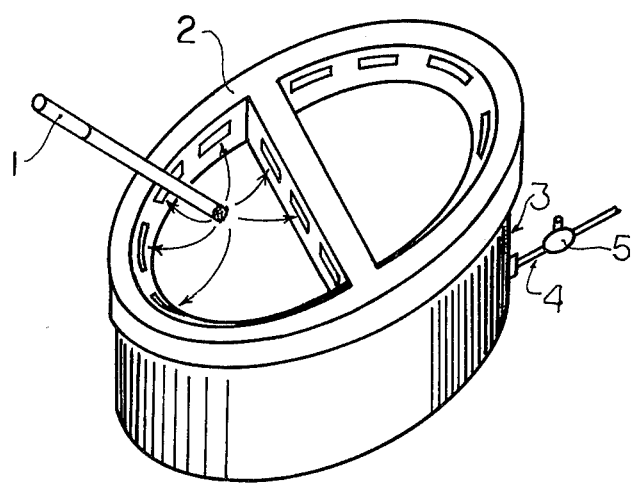
FIG. 1 is a top perspective view of the ash tray unit.

On FIG. 1 is seen a smoking cigarette 1 placed on a removable ash tray 2, which consists a center bridge with several side inlet vents. Below the ash tray there is a cylindrical housing 3, an electric cord 4 and an "on-off" electric switch 5.

Figure 2:
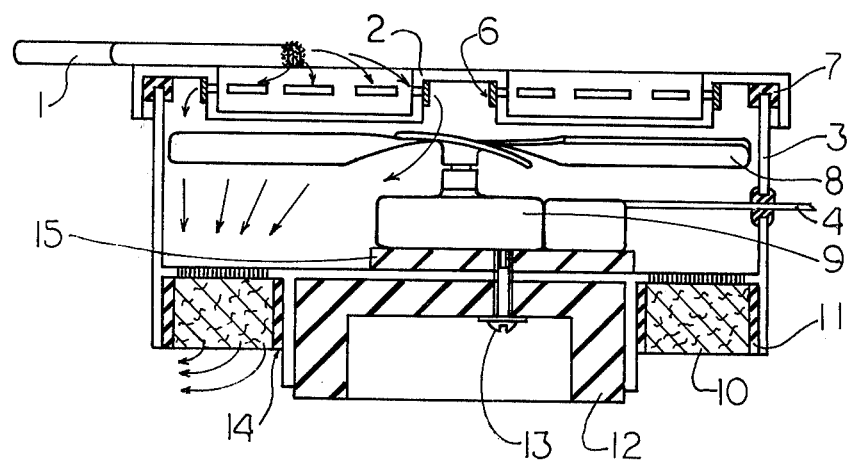
FIG. 2 is a sectional view of the unit.

On FIG. 2 is seen the smoking cigarette 1, the removable ash tray 2 with flame and ash arrestors 6. Below there is a seal 7 and the cylindrical housing 3 with a perforated ring at the bottom and filter seals 11 and 14, sealing a smoke filter 10. Inside of the housing there is a fan 8 with an electric motor 9, resting on a rubber pad 15. In the bottom of the unit there is an anti vibration support 12. Screws 13 connect the electric motor 9, the rubber pad 15 and the anti vibration support 12 to the bottom of the housing 3. The electric cord 4 brings electricity to the electric motor 9. Unit can be powered also by batteries, placed inside of the housing or in the anti vibration support.

The smoke which is produced by cigarettes or cigars placed on the ash tray 2 is drawn into the unit by the electric fan 8 through the side inlet vents of the ash tray 2, thru the flame and ash arrestors 6, then is forced through the perforated ring in the bottom of the housing 3 and the smoke filter 10. Improved air is returned to the surrounding environment.

I claim:

1. An ash tray unit, containing:
   an ash tray having a center bridge with several side vents, said ash tray having a flame and ash arrestors,
   a housing having a perforated ring on the bottom, said housing having a compartment for the smoke filter at the bottom, said housing having smoke seals in lower part,
   a fan means mounted in said housing,
   a seal between the ash tray and the housing,
   an easy to change smoke filter,
   an anti vibration support.

* * * * *